United States Patent
Khosravy et al.

(10) Patent No.: US 9,015,591 B2
(45) Date of Patent: Apr. 21, 2015

(54) DYNAMIC VISUALIZATION GENERATION AND IMPLEMENTATION

(75) Inventors: Moe Khosravy, Bellevue, WA (US); Christian Liensberger, Bellevue, WA (US); Anthony Nino Bice, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 13/517,519

(22) Filed: Jun. 13, 2012

(65) Prior Publication Data

US 2013/0339363 A1    Dec. 19, 2013

(51) Int. Cl.
G09G 5/00    (2006.01)
G06F 17/24    (2006.01)
G06F 17/30    (2006.01)

(52) U.S. Cl.
CPC ........ G06F 17/246 (2013.01); G06F 17/30991 (2013.01)

(58) Field of Classification Search
CPC .................. G06F 17/30023; G06F 17/30861; G06F 17/30011; G06F 3/0482
USPC ......... 707/727, 728, 731, 736, 738, 748, 791; 715/204, 212, 227, 732
See application file for complete search history.

(56) References Cited

U.S. PATENT DOCUMENTS

| | | | |
|---|---|---|---|
| 5,894,311 A | 4/1999 | Jackson | |
| 6,320,586 B1 | 11/2001 | Plattner et al. | |
| 6,707,454 B1 | 3/2004 | Barg et al. | |
| 6,715,127 B1 * | 3/2004 | Eschbach et al. | 715/202 |
| 7,111,007 B2 | 9/2006 | Thier et al. | |
| 8,650,154 B2 * | 2/2014 | Nair et al. | 707/610 |
| 2002/0194095 A1 | 12/2002 | Koren | |
| 2004/0085316 A1 | 5/2004 | Malik | |
| 2014/0114912 A1 * | 4/2014 | Nair et al. | 707/608 |

FOREIGN PATENT DOCUMENTS

EP    1335323 A2 *    8/2003

OTHER PUBLICATIONS

Kroeker, Kirk L., "Seeing Data: New Methods for Understanding Information", In IEEE Computer Graphics and Applications, vol. 24, Issue 3, May 2004, pp. 6-12.
"Tableau", Retrieved on: Jan. 31, 2012, Available at: http://www.tableausoftware.com/products/desktop#breakthrough-technology.

* cited by examiner

*Primary Examiner* — Cheryl Lewis
(74) *Attorney, Agent, or Firm* — Jim Banowsky; Leonard Smith; Micky Minhas

(57) ABSTRACT

Embodiments are directed to selecting and applying data-specific presentations, to adaptively selecting visual presentations based on historical data and to providing rendering hints for data presentations. In one scenario, a computer system receives an indication that a visual presentation is to be applied to a specified portion of data. The computer system analyzes the specified data to determine which of a plurality of data presentations is most relevant for the specified data. The relevance is based on relevancy factors including one or more of the following: end-user profile, structure of the specified data and patterns within the specified data. The computer system then applies the determined appropriate visual presentation to the specified data.

20 Claims, 5 Drawing Sheets

DYNAMIC VISUALIZATION GENERATION AND IMPLEMENTATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to manage and perform operations on large portions of data. For example, spreadsheet applications may allow users to perform mathematical, organizational or other types of operations on large data sets. Within the spreadsheet applications, users may also be able to create or select visual presentations for the data. Examples of such presentations include tables, charts, graphs and reports. Thus, a user may be able to select a chart, table, graph or report for a given portion of data. However, many times the quantity and nature of the data may not lend itself to clear categorization. In such cases, a user may have a large portion of raw data and may not know which type of presentation to use.

BRIEF SUMMARY

Embodiments described herein are directed to selecting and applying data-specific presentations, to adaptively selecting visual presentations based on historical data and to providing rendering hints for data presentations. In one embodiment, a computer system receives an indication that a visual presentation is to be applied to a specified portion of data. The computer system analyzes the specified data to determine which of a plurality of data presentations is most relevant for the specified data. The relevance is based on relevancy factors including one or more of the following: end-user profile, structure of the specified data and patterns within the specified data. The computer system then applies the determined appropriate visual presentation to the specified data.

In another embodiment, a computer system adaptively selects visual presentations based on historical data. The computer system analyzes prior visual presentation selections for specified sets of data and determines, based on which visual presentations were selected for the specified data sets, which visual presentations are most relevant for a currently selected data set. The relevance is based on relevancy factors including one or more of the following: end-user profile, structure of the specified data and patterns within the specified data. The computer system then applies the determined appropriate visual presentation to the currently selected data set.

In still another embodiment, a computer system provides rendering hints for data presentations. The computer system selects a portion of data for uploading to a data store and also selects rendering hints to be applied to the selected portion of data. The rendering hints indicate how the selected data is to be rendered in a visual presentation. The computer system then appends the selected rendering hints to the selected portion of data and uploads the selected portion of data and the appended rendering hints to the data store.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
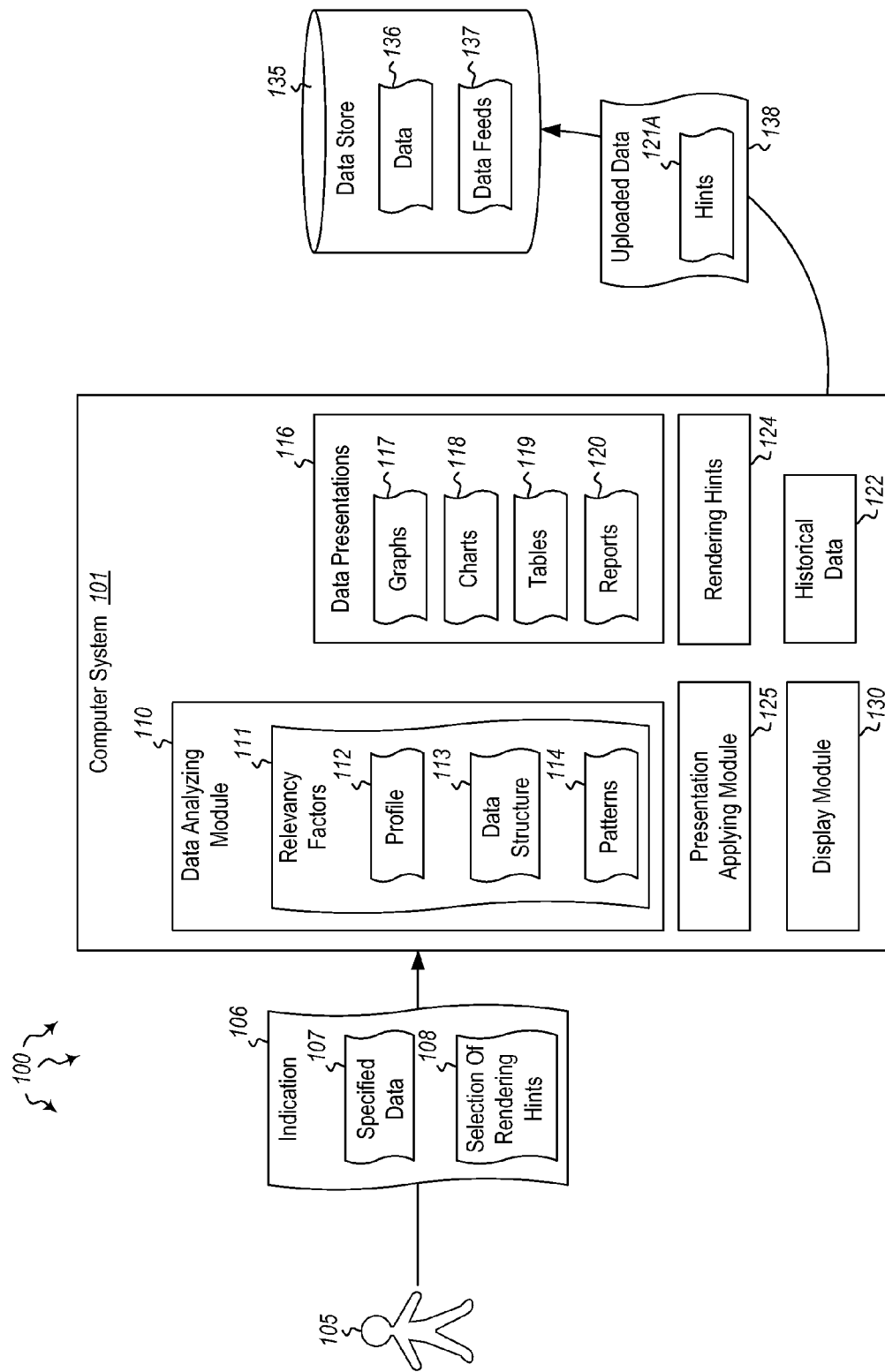
FIG. 1 illustrates a computer architecture in which embodiments of the present invention may operate including selecting and applying data-specific presentations.

Embodiments described herein are directed to selecting and applying data-specific presentations, to adaptively selecting visual presentations based on historical data and to providing rendering hints for data presentations. In one embodiment, a computer system receives an indication that a visual presentation is to be applied to a specified portion of data. The computer system analyzes the specified data to determine which of a plurality of data presentations is most relevant for the specified data. The relevance is based on relevancy factors including one or more of the following: end-user profile, structure of the specified data and patterns within the specified data. The computer system then applies the determined appropriate visual presentation to the specified data.

In another embodiment, a computer system adaptively selects visual presentations based on historical data. The computer system analyzes prior visual presentation selections for specified sets of data and determines, based on which visual presentations were selected for the specified data sets, which visual presentations are most relevant for a currently selected data set. The relevance is based on relevancy factors including one or more of the following: end-user profile, structure of the specified data and patterns within the specified data. The computer system then applies the determined appropriate visual presentation to the currently selected data set.

In still another embodiment, a computer system provides rendering hints for data presentations. The computer system selects a portion of data for uploading to a data store and also selects rendering hints to be applied to the selected portion of data. The rendering hints indicate how the selected data is to be rendered in a visual presentation. The computer system then appends the selected rendering hints to the selected portion of data and uploads the selected portion of data and the appended rendering hints to the data store.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. Computer system 101 may be any type of local or distributed computer system, including a cloud computing system. As used herein, the terms "cloud" or "cloud computing" refer to a model for enabling ubiquitous, convenient, on-demand network access to a shared pool of configurable computing resources (e.g., networks, servers, storage, applications, and/or services) that can be rapidly provisioned and released with minimal management effort or service provider interaction, as defined by the National Institute of Standards and Technology (NIST). The cloud computing model includes characteristics such as on-demand self-service, broad network access, resource pooling, rapid elasticity and measured service. The cloud computing model may be implemented in various service models including Software as a Service (SaaS), Platform as a Service (PaaS), or Infrastructure as a Service (IaaS), and may incorporate one or more deployment models including private clouds, community clouds, public clouds and hybrid clouds.

The computer system includes various modules for performing a variety of different functions. For instance, data analyzing module 110 may be configured to receive indication 106 from user 105. The data analyzing module may access the identification to determine which data has been specified by the user. Then, based on which data has been identified, the analyzing module may analyze the data to determine which of a variety of presentations 116 is to be used to present the data.

As used herein, the term "presentation" or "visual presentation" refers to any visual representation of data. Presentations may include visualizations such as graphs, charts and tables. Presentations may also include interactive items such as reports. Different presentations may be more suited to different types of data. For instance, the analyzing module may determine that the data includes names and addresses of different persons. The analyzing module may determine that a table is the best way to present that data. In such cases, the presentation applying module 125 would apply a table in the size, shape and orientation that was the most suitable for the specified data.

In some cases, the data analyzing 110 and presentation applying modules 125 (along with any others used to provide these services) may be provided as an extension to other software programs or services. The extension allows users to select (e.g. via a "right click" on the mouse) a "Create chart" or "Create table" icon in a word processing, spreadsheet or other application. The extension allows a user to specify which data 136 or data feed 137 is to be used when creating the char or table (or other presentation). In some cases, where access to the data is limited, the extension asks the user to provide a username and password, indicating the user's subscription to the data.

The extension then generates an appropriate presentation by receiving data from the specified data 136 or data feed 137. The extension may also be provided with a definition of a report, chart or other presentation that was recommended for the data. The definition may include a presentation that was provided by the provider or producer of the data (e.g. U.S. Bureau of Labor Statistics), by a community associated with that data (e.g. a national think tank or other organization associated with the Bureau of Labor Statistics) or by the provider of the extension or the office suite application. The definition may be included in metadata that is appended to the data or data feed. This metadata includes the definition of the presentation name, series definitions, axis marks, etc., along with a set of aggregated queries to the data store 135 that can be interpreted by the service to produce data that can span numerous rows. As will be understood, the data store 135 may be any type of physical or virtual, local or remote, distributed (storage area network (SAN)), cloud-based data storage or any combination thereof. The data store may, in some cases, be a data marketplace where data is bought and sold from data producers.

The metadata may include table, chart, graph or other metadata including the chart's name, type, color, names, units, location, scale or other characteristics. The metadata may include metadata used to build presentations in the (office suite) application. Data metadata may include column or parameter name, column/parameter type, "" unit, classifier, etc. Marketplace metadata may include account identifier (ID), subscription ID, offer ID, set of queries, indication to aggregate or sequence, etc. Visualization metadata may include the colors and/or the presets used to present the final form of the document/spreadsheet/etc. and the actual payload (i.e. the data results coming back from the data store). These concepts will be explained further below with regard to methods 200 and 300 of FIGS. 2 and 3, respectively.

Figure 2:
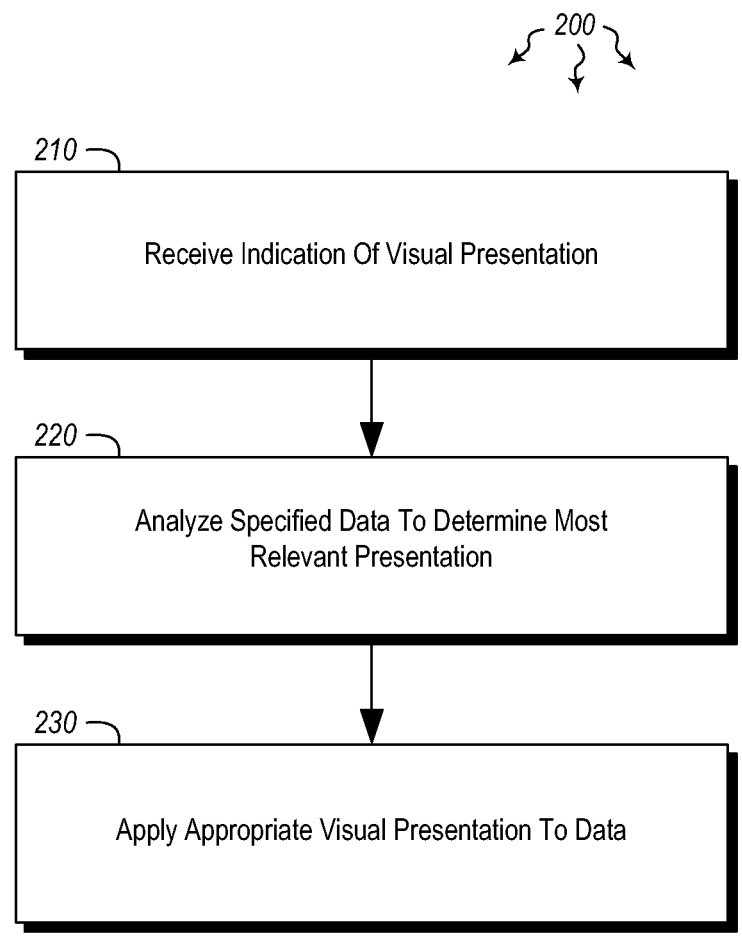
FIG. 2 illustrates a flowchart of an example method for selecting and applying data-specific presentations.
Figure 3:
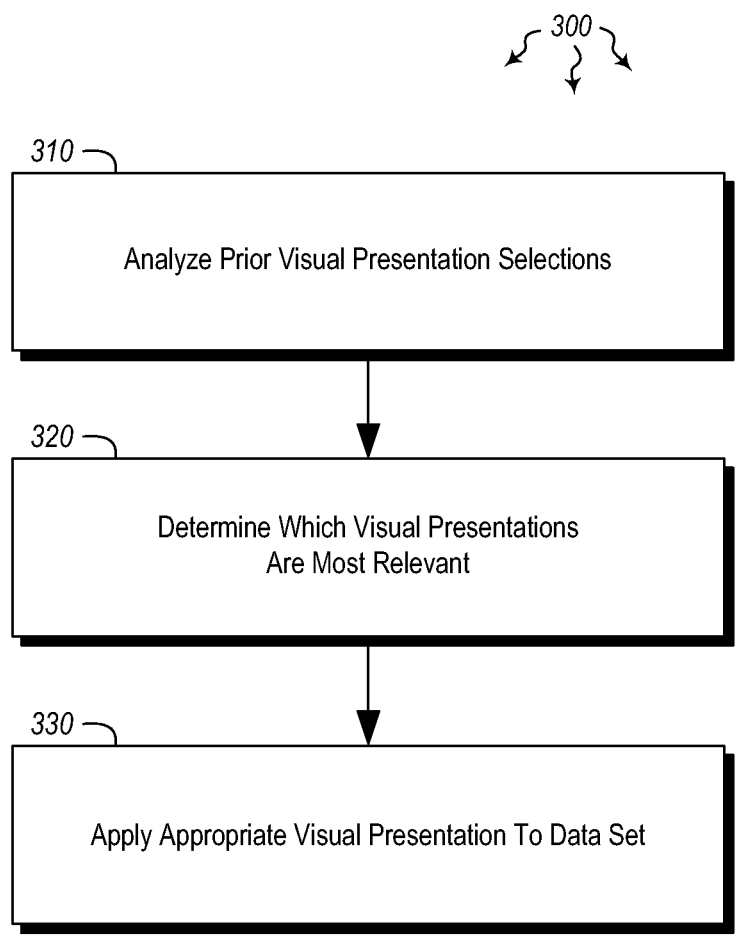
FIG. 3 illustrates a flowchart of an example method for adaptively selecting visual presentations based on historical data.
Figure 4:
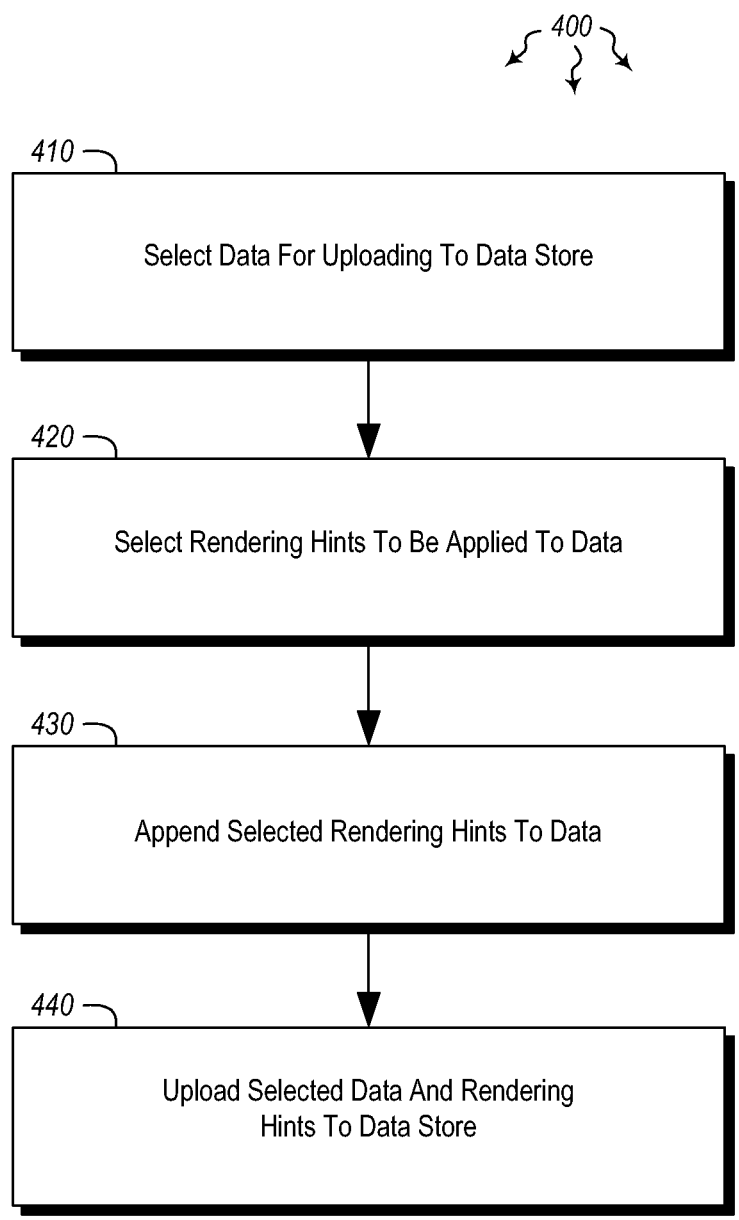
FIG. 4 illustrates a flowchart of an example method for providing rendering hints for data presentations.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for selecting and applying data-specific presentations. The method 200 will now be described with frequent reference to the components and data of environment 100.

Method 200 includes an act of receiving an indication that a visual presentation is to be applied to a specified portion of data (act 210). For example, data analyzing module 110 of computer system 101 may receive indication 106 from user 105. The indication indicates that a visual presentation is to be applied to the data specified by the user (data 107). The user may enter this indication through a standalone application, service or user interface (UI), or through an extension to an application, service or UI. The extension may apply to and function with multiple different applications. For instance, as mentioned above, the extension may apply to an office suite with a word processing application, a spreadsheet application, a presentation application and others. The visual presentation may include static data (as displayed in graphs 117, charts 118 or tables 119), or may be interactive (as with a report 120). Interactive presentations allow users to apply user input to change or modify the presentation dynamically as the user provides the inputs.

Method 200 further includes an act of analyzing the specified data to determine which of a plurality of data presentations is most relevant for the specified data, the relevance being based on relevancy factors including one or more of the following: end-user profile, structure of the specified data and patterns within the specified data (act 220). For example, data analyzing module 110 may analyze the specified data 107 to determine which data presentation 116 is most relevant. Different types of data may lend themselves to more to certain types of presentations. Some data may be better presented as a report, while other data is better represented as a graph. Still further, some data may be best presented as a combination of charts, graphs and tables. The data analyzing module may determine which presentation is most relevant for each separate part of the specified data. The relevancy is determined based on one or more relevancy factors.

Relevancy factors, as used herein, refer to various indicators or other characteristics of the data that indicate why a certain presentation is suitable for that type of data. Relevancy factors 111 may include end-user profile 112, the structure of the specified data 113 and/or patterns within the data 114. The end user 105 is the person that is viewing the visual presentations of the data. The end user also specifies which data 136 or data feeds 137 are to be included in the visual presentation. The user's profile may indicate certain preferences for visual presentations. For instance, the user's profile may indicate a preference for tables for certain types of data, and a preference for reports for other types of data. The data analyzing module may also look at historical data 122 indicating the user's past choices for visual presentations. Thus, based on past decisions, the data analyzing module may make intelligent decisions about the relevancy of a particular presentation.

The structure of the data may also be used to determine the relevancy of a particular presentation to a specified portion of data. If the data is structured as a list of items in columns and rows, for example, a table may be the most appropriate (i.e. the most relevant) presentation for that data. If the data is structured as graphics and associated text, a chart or graph may be the most relevant presentation. Thus, data structure may be used to determine relevancy. Furthermore, patterns in the data (such as one column including names, another including addresses and another including phone numbers) may be used to determine which presentation is most relevant. Patterns, data structure and user profile may all be consulted to determine which presentation is most relevant for any given set of data.

Determining relevancy may also include identifying other data (perhaps from within data store 135, or from outside it (e.g. from the internet)) which is related to the data currently presented. For instance, if the user had selected sports statistics data for a specific player, a relevancy determination may determine that team information, league information and ticket sales information are also relevant. These additional portions of information may be presented to the user 105. The user may then decide whether to generate presentations for those additional portions of data that were determined to be relevant. Determining relevancy may further include determining which presentations other users, other user profiles or other industries have identified as data that is relevant to the specified data. This data may similarly be presented to the user for generation of a visualization.

In some embodiments, various questions may be presented to user 105 to determine the relevance of a specified portion of data. The questions may assist the system in determining whether certain types or sources of data are relevant to that user. The user then answers the questions, indicating which types and/or sources of data are relevant to the user. Then, in response to the received answers, the data analyzing module 110 determines the relevance of the specified data. The user's answers, along with other relevancy factors, may be used to determine which data to present to the user and which presentations to use to present the data to the user.

In some cases, data may be uploaded from computer system 101 to data store 135 (e.g. data 138). The uploaded data may be tagged with tags that identify one or more characteristics of the data. For instance, the tags may indicate that the data is owned by the end user 105 and that the data is related to a specific project the user is involved in at work. The data analyzing module 110 may determine logical joints between the different portions of tagged uploaded data. Thus, in situations where the data store is storing data from multiple different users, or has access to data from multiple users stored on other storage systems, the data analyzing module may analyze the data tags to determine similarities between the different users' data. In some cases, this may be referred to as business domain joining, where logical connections are discovered between different user's or different businesses' data. Still further, if the user is aware of logical connections, the user may provide an indication of logical joints between the portions of tagged uploaded data. This information may then be presented to the end user as being potentially relevant. The tagged data may also be categorized according to various user-defined or other predefined data categories. The categorization may further assist in determining relevance, as some categories of data may be more suited to certain presentations.

Method 200 also includes an act of applying the determined appropriate visual presentation to the specified data (act 230). Thus, once the appropriate, relevant visual presentation has been determined based on one or more of the relevancy factors, the presentation applying module 125 applies the selected presentation to the specified data (e.g. data 136 or data feed 137). The generated presentation may then be displayed on display 130. In addition to the generated presentation, any portions of additional data determined to be relevant to the determined appropriate presentation may be automatically applied to the generated presentation, or may be displayed in a separate presentation.

FIG. 3 illustrates a flowchart of a method 300 for adaptively selecting visual presentations based on historical data. The method 300 will now be described with frequent reference to the components and data of environment 100 of FIG. 1, as well as FIGS. 5A and 5B.

Method 300 includes an act of analyzing one or more prior visual presentation selections for specified sets of data (act 310). For example, data analyzing module 110 may access and analyze past presentations selections from the historical data 122. The selections may have been from the end user 105, other end users, other user's within the end user's company or another company, or other industry users. The selections indicate which presentations were selected for which data sets.

Method 300 also includes an act of determining, based on which visual presentations were selected for the specified data sets, which one or more visual presentations are most relevant for a currently selected data set, the relevance being based on relevancy factors including one or more of the following: end-user profile, structure of the specified data and patterns within the specified data (act 320). Accordingly, data analyzing module 110 may analyze the historical data 122 to determine which presentation is most relevant. Past selections may be used by themselves in determining the relevancy of a particular presentation, or may be used in conjunction with the other relevancy factors 111 (user profile 112, data structure 113 and/or data patterns 114), as explained above.

In some cases, different weights may be applied for specified users, specified profiles or specified industries. Accordingly, when determining relevancy, more or less weight may be applied to certain users, certain data structures, or certain past selections. For example, in one embodiment, a greater amount of weight may be given to past selections when determining relevancy. This may be based on a desire to have uniformity throughout a company's presentations. In another embodiment, a greater amount of weight may be given to data structure and/or data patterns. In such cases, it may be more desirable to have a presentation that matches the data structure, regardless of past decisions. These are merely two examples among many and should not be read as limiting. Moreover, it will be understood that any combination of weighting may be applied, giving some relevancy factors more or less weighting based on the current context (e.g. which end user is currently using the program, which data set is being used, etc.).

Method 300 further includes an act of applying the determined appropriate visual presentation to the currently selected data set (act 330). Once the most relevant presentation has been determined for the specified data, the presentation applying module 125 applies the selected presentation to the data. In this manner, a presentation is dynamically generated specifically for the chosen data set. In some embodiments, as shown in FIG. 5A, an application may present a selection of data feeds to a user (e.g. data feeds 501A1, 501A2 and 501A3). The user may then select one or more of the feeds (in FIG. 5A, data feed 2 is selected). Upon receiving the user's selection of data feeds, the presentation applying module 125 may automatically generate a visual presentation that is appropriate for the selected data feed. In FIG. 5A, a table 502 is generated for data feed 2 (501A2). As will be understood, any type of presentation may be chosen for a set of data or a data feed. Accordingly, table 502 is merely one example of a presentation among many possible presentation types.

Figure 5B:
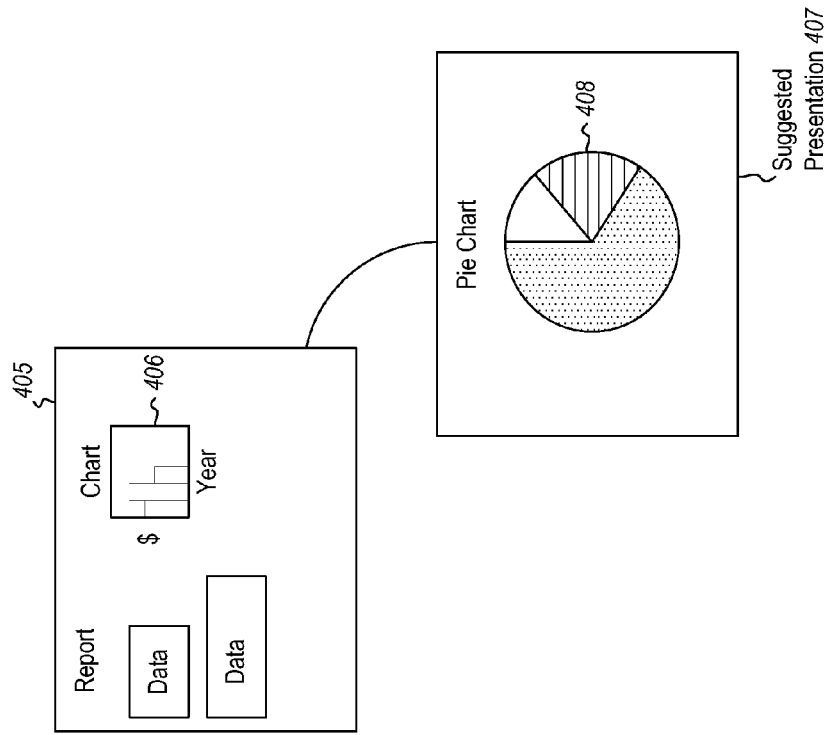
FIGS. 5A and 5B illustrate embodiments in which data-specific presentations are selected and applied.
Figure 5A:
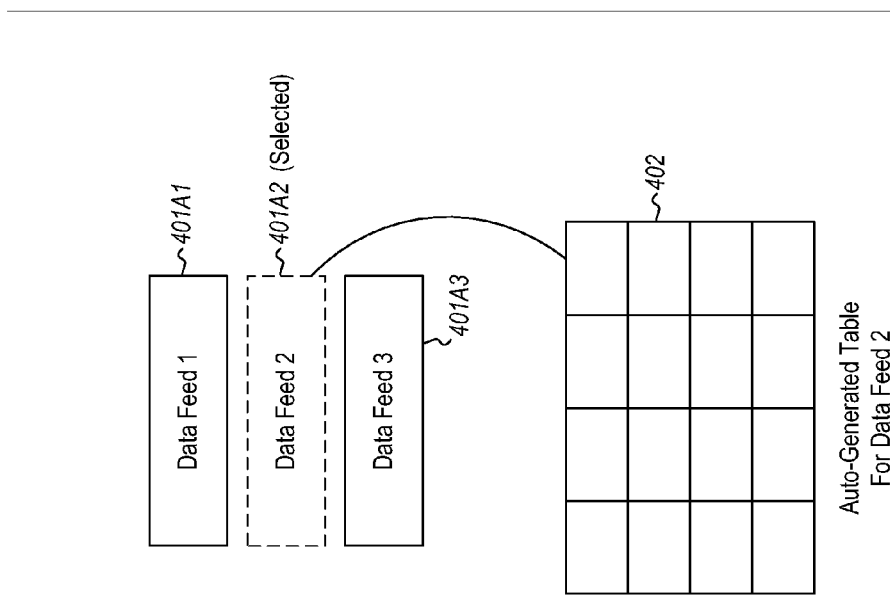

Still further, as shown in FIG. 5B, a software application may present potential visual presentations for selection by the user. Accordingly, in some cases, a user may be using the software application and presentation 505 may be displayed on the user's display. The currently displayed presentation 505 may be a report with a chart 506 and various other data. The system may determine that other data of which the system is aware may be relevant to the currently displayed report. Accordingly, the system may automatically generate a visual presentation for the data determined to be relevant to that data displayed in the original visual presentation. As such, suggested presentation 507 with its accompanying pie chart 408 may be displayed next to or near the original presentation 505. It will be understood that many different types of presentation may be presented to the user, and that the user can specify whether to display the relevant data or not, and how the relevant data is to be displayed (i.e. the user can select which presentation is used to show the relevant additional data). In this manner, the user can be shown the data they originally selected, along with additional relevant data. The relevancy may be determined according to any of the relevancy determining methods described above.

Turning now to FIG. 4, FIG. 4 illustrates a flowchart of a method 400 for providing rendering hints for data presentations. The method 400 will now be described with frequent reference to the components and data of environment 100.

Method 400 includes an act of selecting a portion of data for uploading to a data store (act 410). For example, user 105 may select various data 136 and/or data feeds 137 from the data store 135. The specified data 107 may be sent to the computer system 101 via indication 106. The indication may also include the user's selection 108 of one or more rendering hints to be applied to the selected portion of data (act 420). The rendering hints 121 indicating how the selected data is to be rendered in a visual presentation. In some cases, the rendering hints are appended to the uploaded data 138 as metadata (e.g. 121A). In this manner, when a data owner or other user uploads data to the data store 135, the owner can specify which presentations are to be used with that data (or at least, which presentations are recommended for that data). In some cases, the rendering hints 121 may be specific to a particular computing device or software application. Thus, if that computing device is used, or that software application is used, certain presentations will be recommended by the hints as being most applicable or as being preferred for that computer system or application.

Method 400 includes an act of appending the selected rendering hints to the selected portion of data (act 430). Thus, as mentioned above, the rendering hints 121A may be applied to the uploaded data 138. User interfaces (UIs) and/or application programming interfaces (APIs) may be used to apply rendering hints to a selected portion of data. The UIs and APIs provide a convenient way for users or programmers to apply rendering hints to data. The data is then uploaded with its appended rendering hints to the data store (act 440), and may be rendered according to the appended rendering hints. In this manner, a data owner may have at least some degree of control over how the owner's data is presented in a visual presentation.

Accordingly, methods, systems and computer program products are provided which select and apply data-specific presentations. Moreover, methods, systems and computer program products are provided which adaptively select visual presentations based on historical data and provide rendering hints for data presentations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for selecting and applying data-specific presentations, the method comprising:
   an act of receiving an indication that a visual presentation is to be applied to a specified portion of data;
   an act of analyzing the specified data to determine which of a plurality of data presentations is most relevant for the specified data, the relevance being based on relevancy factors including one or more of the following: end-user profile, structure of the specified data and patterns within the specified data; and
   an act of applying the determined appropriate visual presentation to the specified data.

2. The method of claim 1, wherein the visual presentations comprise at least one of the following: a chart, a table, a graph and a report.

3. The method of claim 1, further comprising displaying the generated visual presentation.

4. The method of claim 1, further comprising automatically applying one or more portions of additional data to the determined appropriate presentation based on determined relevancy.

5. The method of claim 1, further comprising:
   an act of presenting one or more questions to a user to determine relevance of a specified portion of data;
   an act of receiving one or more answers to the presented questions; and
   in response to the received answers, an act of determining the relevance of the specified portion of data.

6. The method of claim 1, further comprising an act of categorizing the specified data according to one or more predefined data categories.

7. The method of claim 1, wherein determining relevancy comprises identifying what other users, other user profiles or other industries have identified as data that is relevant to the specified data.

8. The method of claim 1, wherein uploaded data is tagged with tags that identify one or more characteristics of the data.

9. The method of claim 8, further comprising determining one or more logical joints between the portions of tagged uploaded data.

10. The method of claim 9, wherein a user provides an indication of logical joints between the portions of tagged uploaded data.

11. At a computer system including at least one processor and a memory, a computer-implemented method for adaptively selecting visual presentations based on historical data, the method comprising:
    an act of analyzing one or more prior visual presentation selections for specified sets of data;
    an act of determining, based on which visual presentations were selected for the specified data sets, which one or more visual presentations are most relevant for a currently selected data set, the relevance being based on relevancy factors including one or more of the following: end-user profile, structure of the specified data and patterns within the specified data; and
    an act of applying the determined appropriate visual presentation to the currently selected data set.

12. The method of claim 11, wherein the prior visual presentation selections comprise at least one of a specified user's selections, a specified user profile's selections and a specified industry's selections.

13. The method of claim 12, wherein different weights are applied for specified users, specified profiles or specified industries.

14. The method of claim 11, wherein a software application presents a selection of data feeds to a user and, upon receiving the user's selection of data feeds, automatically generates a visual presentation appropriate for the selected data feed.

15. The method of claim 14, wherein the software application further presents one or more potential visual presentations for selection by the user and, upon receiving the user's selection of visual presentation, automatically generates the selected visual presentation in addition to the original visual presentation.

16. At a computer system including at least one processor and a memory, a computer-implemented method for providing rendering hints for data presentations, the method comprising:

an act of selecting a portion of data for uploading to a data store;

an act of selecting one or more rendering hints to be applied to the selected portion of data, the rendering hints indicating how the selected data is to be rendered in a visual presentation;

an act of appending the selected rendering hints to the selected portion of data; and an act of uploading the selected portion of data and the appended rendering hints to the data store.

17. The method of claim 16, wherein the rendering hints are appended to the uploaded data as metadata.

18. The method of claim 16, wherein the selected portion of data is rendered according to the appended rendering hints.

19. The method of claim 16, wherein the rendering hints are specific to a particular computing device or software application.

20. The method of claim 16, wherein at least one of a user interface (UI) and an application programming interface (API) is used to apply the rendering hints to the selected portion of data.

* * * * *